June 6, 1944. E. ALBAUGH, SR  2,350,332
DEVICE FOR SEPARATING WORMS AND LARVAE FROM NUT MEATS
Filed July 26, 1941  4 Sheets-Sheet 1

INVENTOR.
Ellis Albaugh, Sr.
BY
Caesar and Rivise
ATTORNEYS

June 6, 1944.  E. ALBAUGH, SR  2,350,332
DEVICE FOR SEPARATING WORMS AND LARVAE FROM NUT MEATS
Filed July 26, 1941  4 Sheets-Sheet 2

INVENTOR.
Ellis Albaugh, Sr.
BY
Caesar and Rivise
ATTORNEYS

June 6, 1944. E. ALBAUGH, SR 2,350,332
DEVICE FOR SEPARATING WORMS AND LARVAE FROM NUT MEATS
Filed July 26, 1941 4 Sheets-Sheet 3

INVENTOR.
Ellis Albaugh, Sr.
BY
Caesar and Rivise
ATTORNEYS

Patented June 6, 1944

2,350,332

UNITED STATES PATENT OFFICE 2,350,332

DEVICE FOR SEPARATING WORMS AND LARVAE FROM NUT MEATS

Ellis Albaugh, Sr., San Antonio, Tex.

Application July 26, 1941, Serial No. 404,225

8 Claims. (Cl. 209—114)

This invention relates to devices for separating worms and larvae from nut meats, and concerns itself particularly with devices for separating worms and larvae from broken pecan nut meats.

By way of introduction, it may be stated that in certain localities such as Texas, pecan nuts are attacked by an insect pest which deposits an egg in the embryo nut. As a result many nuts, when ripe, contain a worm or larva about a half of an inch long. When the nuts are shelled or cracked by means of automatic machinery, the worms and larvae become intermingled with the pecan meats. Unless the worms and larvae are removed, the nut meats are wholly unsuitable for human consumption.

Prior to the present invention, the separation of worms and larvae has been practiced by manual labor, as many as fifteen girls standing beside a slowly moving conveyor belt on which were spread the pecan meats, and looking for worms and larvae. This process is a slow, tedious and very inefficient operation, and even though the girls are very experienced and the last girl in the row discards as many worms as each of the others, nevertheless there is never any assurance that all of the worms have been removed. It is therefore not surprising that government inspectors have on many occasions found worms in isolated portions of warehouses containing pecan nut meats, resulting in condemnation of the entire warehouse.

A primary object of this invention is to provide a mechanical device for separating worms and larvae from nut meats, which is practically automatic in its operation and which requires a minimum of care and attention, thereby largely eliminating the human element.

Another object is to provide a device of the foregoing type, which is relatively simple in construction and mode of operation, which requires very little floor space, and which is very inexpensive and effective in operation.

In its very essence, the device of the invention comprises an inclined, endless conveyor belt, means to move said belt with its upper stretch travelling up the incline, and means to impart a trough-like shape to the upper stretch of the belt. The trough-like shape is produced by simultaneously raising both edges of the belt during the upper portion of its travel. Means are preferably provided to feed the infested nut meats at one or both sides of the trough-shaped portion of the belt so that the meats will tend to slide down into the trough.

At this point, it may be stated that the operation of the device of the invention is based upon the principle that worms, being cylindrical when lying full length and more or less hoop-shaped when dead, will roll down an inclined surface much more readily than pecan meats, which have at least one flat side.

The underlying concept of the invention is capable of being embodied in many different structural forms, several of which will now be described for the purpose of illustrating the invention.

Referring briefly to the drawings.

As has been stated, the device of the invention consists essentially of an inclined, endless conveyor belt, means to move said belt with its upper stretch travelling up the incline, and means to impart a trough-like shape to the upper stretch of the belt.

Figure 1:
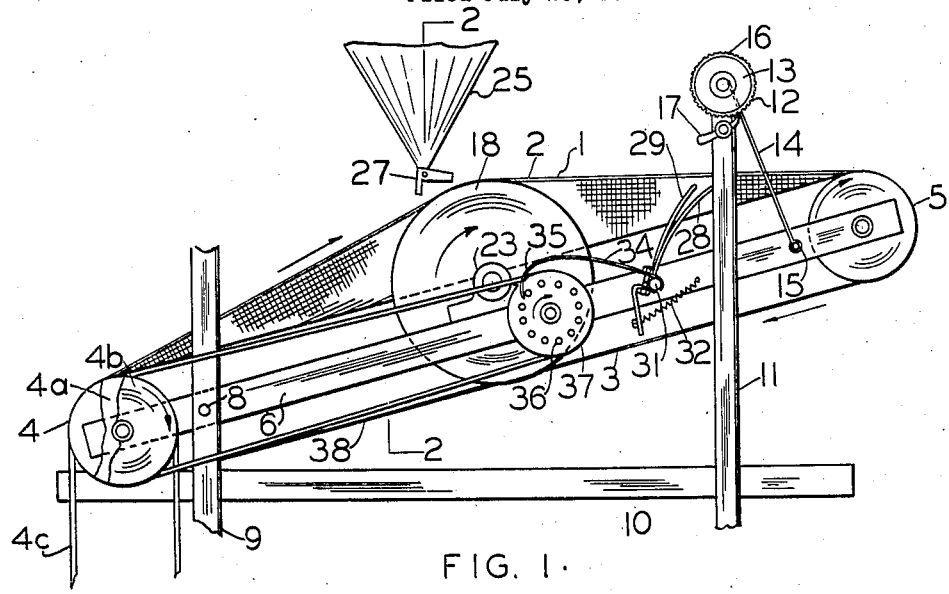
Figure 1 is a side elevation, partly broken away, of one embodiment of the invention comprising a single separating unit.
Figure 2:
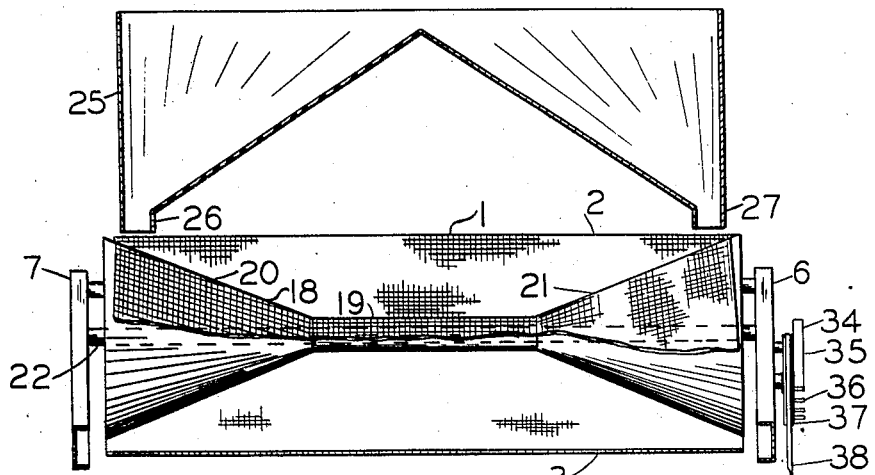
Figure 2 is a transverse vertical cross-section on line 2—2 of Figure 1.
Figure 3:
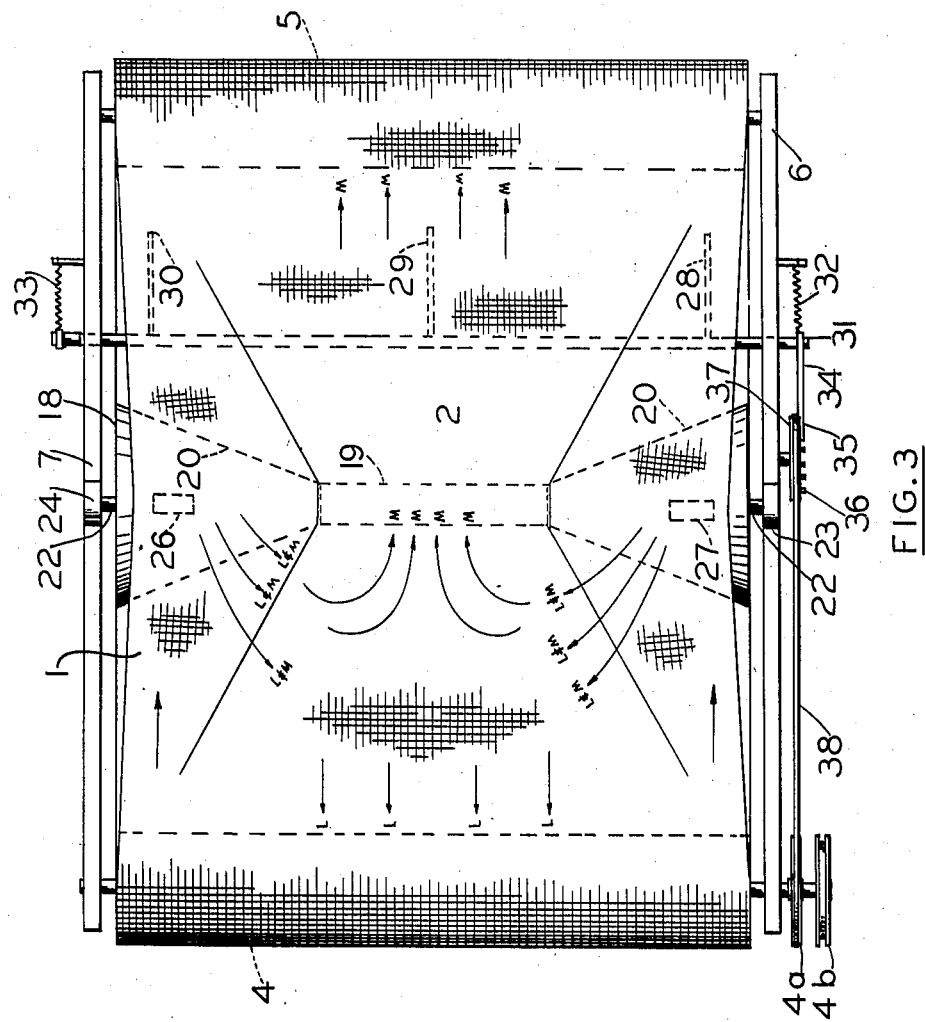
Figure 3 is a plan view of the device of Figures 1 and 2, the hopper for feeding the infested nut meats being omitted for greater clearness.

Referring to Figures 1, 2 and 3, wherein is shown a single separating unit, the endless conveyor belt is indicated by the numeral 1, the upper stretch of the belt by 2 and the lower stretch by 3. The belt is shown as being trained over two end drums 4 and 5. The belt may advantageously be of woven wire or other suitable fabric, or it may be of embossed rubber. A rough-surfaced material such as is represented by a woven wire screen of 12 meshes to the inch has been found to be particularly suitable for the conveyor belt.

The two end drums 4 and 5 are mounted between two inclined frame-members 6 and 7, which are shown as being pivotally mounted at 8 in a suitable frame, the other members of the frame being denoted in Figure 1 by the numerals 9, 10 and 11. It will be understood that the primary purpose of the frame is to support the essential elements of the device in their cooperative relationship, and that the specific details of the frame form no part of the invention.

The purpose of pivotally mounting the frame-members 6 and 7 is to render it possible to vary the angle of inclination of the conveyor belt for a particular set of operating conditions.

In Figure 1 is illustrated a suitable form of mechanism for moving the frame-members 6 and 7 to a desired angular position. The illustrative means comprises a windlass 12 mounted on the vertical frame-member 11. The windlass consists of a drum 13 about which is wound a cable or rope 14, one end of the cable being connected to the frame-member 6 as at 15. By rotating the drum 13 by means of a handle (not shown), the right-hand side of the frame-members 6 and 7 may be raised or lowered a desired amount, thereby changing the inclination of the belt a corresponding amount. A toothed wheel 16 mounted on the same shaft as the drum 13 and a cooperating pawl 17 pivotally mounted on the vertical frame-member 11 may be provided to maintain the frame-members 6 and 7 at a desired angular setting.

The end drums 4 and 5 are preferably of uniform diameter. Mounted on the same shaft as the end drum 4 are two pulleys 4a and 4b, each of which serves a purpose to be hereinafter pointed out. Mounted intermediate the drums 4 and 5 is a third drum 18, which is of such construction as to raise the marginal edges of the upper stretch 2 of the belt during at least a portion of its course. In its preferred construction, the drum 18 has a middle cylindrical portion 19 and two end portions 20 and 21 of conical shape. The drum 18 is provided with a shaft 22, by means of which it is supported for rotation in bearing brackets 23 and 24. These brackets may be mounted on the frame-members 6 and 7 for slidable adjustment.

The conveyor belt 1 may be moved in the direction of the drum 5 by any suitable means, as for instance a pulley and belt connecting one of the drums 4 or 5 to a suitable source of power. The pulley 4b and the belt 4c, shown in Figures 1 and 3, may be used for the purpose of driving the conveyor belt. It will be understood that as the upper stretch of the belt in its travel approaches the intermediate drum 18, the marginal edges are gradually raised above the normal level, thereby forming a trough-shaped portion. As the belt leaves the vicinity of the intermediate drum, the marginal edges of the belt are gradually lowered. The material of which the belt is made is flexible enough to permit the belt to adjust itself to the trough-shape on its upper course and to resume its flat shape on its lower course.

The numeral 25 designates a hopper for feeding the infested nut meats to be apparatus. The hopper is preferably provided with two spouts 26 and 27, each of which is located just above one of the raised margins of the belt. The spouts may be controlled either manually or automatically to feed the infested nut meats in a thin stream onto the belt.

The manner in which the larvae and worms are separated from the nut meats is shown in Figure 3 by means of arrows. The arrows denoted by L & M indicate the path taken by the incoming infested nut meats, the arrows L indicate the path taken by the larvae and the worms, and the arrows M indicate the path taken by the separated nut meats.

It is to be noted that the infested nut meats, as they fall onto the belt 1, tend to roll or slide down into the hollow of the trough formed on the upper stretch of the conveyor belt 1. The worms and larvae, as previously stated, roll more freely than the meats and tend to roll down the middle of the trough and over the lower end of the belt; i. e. over the drum 4, whereas the nut meats tend to be carried up the middle of the trough and over the upper end of the belt; i. e. over the drum 5. It is to be particularly noted that the incoming nut meats do not interfere with the separated nut meats. For the incoming nut meats tend to roll or slide down the side walls of the trough, while the separated meats are carried up the middle portion of the trough.

It will be understood that the speed of the conveyor belt and its angle of inclination may be adjusted to obtain the most effective results for a particular set of operating conditions.

In actual practice, I have found it advantageous to intermittently vibrate the conveyor belt 1 during the upper portion of its course, in order to break up gobs of nut meats, thereby freeing any occluded worms and larvae and preventing them from being carried with the nut meats over the upper drum 5.

In the embodiment of Figures 1, 2 and 3, the mechanism for vibrating the belt consists of a plurality of striking fingers 28, 29 and 30 secured to a transverse shaft 31 mounted in the frame of the apparatus for rocking movement. The rocking movement is imparted to the shaft 31 by connecting the shaft at each of its ends to the frame by means of a spring 32, 33 and providing the shaft with an arm 34, the outer curved end 35 of which cooperates with a number of projecting pins 36 spaced about the periphery of a circular disk 37 mounted for rotation in the frame of the apparatus. The disk is connected to the pulley 4a by means of a belt 38, so that the disk rotates in synchronism with the conveyor belt 1. As the disk 37 rotates, the end 35 of the finger 34 flips over the projecting pins 36, thereby imparting a rocking motion to the shaft 31.

The striking fingers 28, 29 and 30 are adjustable as to their number and relative position to the belt, and may also be controlled as to the length of arc through which their striking ends move. For normal operation, three striking fingers are adequate. I have found it advantageous to position the two outside striking fingers near the edges of the belt and to adjust their arcs of movement so that they strike the underside of the conveyor belt rather vigorously. The middle striking finger is preferably adjusted so as to barely touch the belt. The result is that the meats as they come under the influence of the agitated portion of the belt are jostled toward the center of the belt and any stray worms that are released by the agitation are precipitated down hill at or near the center line of the belt where the oncoming stream of meats is least congested.

Figure 4:
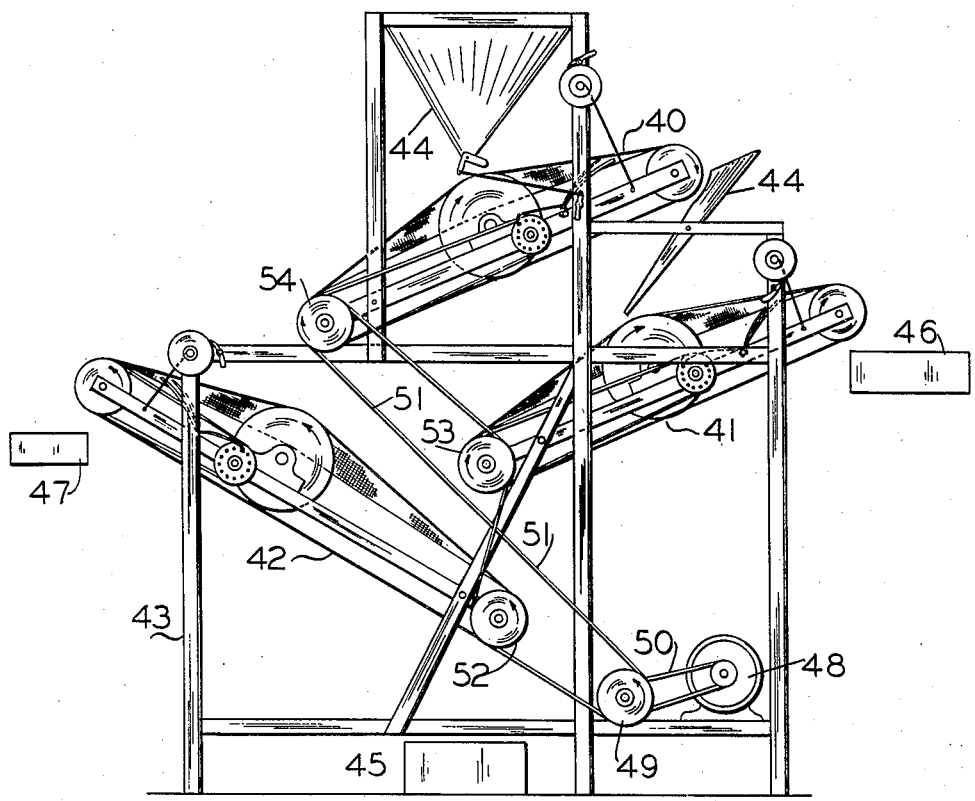
Figure 4 is a side elevation of an embodiment of the invention comprising three separating units.

In Figure 4 is shown an embodiment of the invention comprising three separating units, each of which may be similar in construction to the apparatus illustrated in Figures 1, 2 and 3. Referring to said figure, the three units are denoted generally by the reference numerals 40, 41 and 42. Since the specific details of each unit may be similar to those previously described, it is not considered necessary to do more than point out the relationship of the units to each other.

The three units are mounted in a frame 43, unit 40 being positioned uppermost so as to receive the stream of infested nuts being fed to the apparatus from the hopper 44, unit 41 being positioned to receive the separated nut meats from the upper end of unit 40, and unit 42 being positioned to receive the worms and larvae from the lower end of unit 40. It will be understood that the purpose of unit 42 is to separate any nut meats that may have passed over the lower end of unit 40 with the worms and larvae, and that the purpose of unit 41 is to separate any worms and larvae that may have passed over the upper end of unit 40 with the separated nut meats. A pivoted chute 44 may be provided to conduct the nut meats from the upper end of the first unit to the highest points in unit 41; i. e. at each side of the conical central drum. A similar chute may, if considered necessary, be provided between units 40 and 42.

It is to be noted that unit 41 is positioned with its lower end just above the lower end of unit 42, so that the finally separated worms and larvae from unit 41 will fall onto the belt of unit 42 and be discharged together with the finally separated worms and larvae from 42. A box or other receptacle 45 may be provided at the lower end of unit 42 to catch the finally separated worms and larvae.

A receptacle 46 may be positioned as shown to catch the finally separated nut meats from the unit 41, and a similar receptacle 47 may be positioned as shown to receive the finally separated nut meats from the unit 42.

Suitable means may be provided to drive the three conveyor belts in unison. For instance, the belts may be driven from a common source of power, such as a motor 48. The motor may be connected to a reduction pulley 49 by means of a belt 50, and the pulley 49 may be connected by means of a single belt 51 to the pulleys 52, 53 and 54, each of which is mounted on the same shaft as one of the end drums of each of the units.

Figure 5:
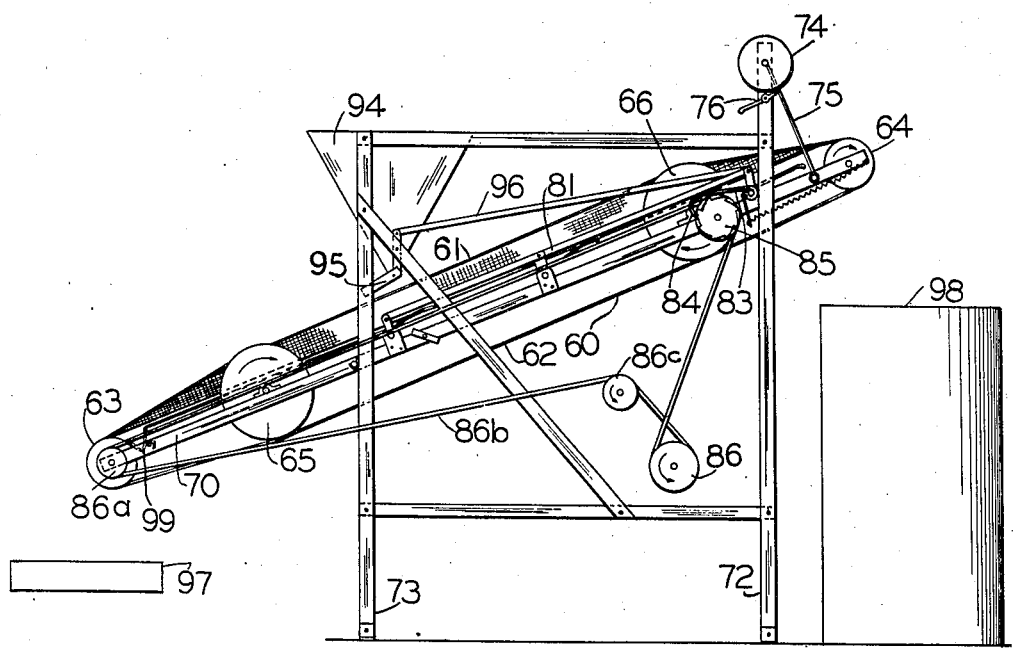
Figure 5 is a side view of another embodiment of the invention.
Figure 6:
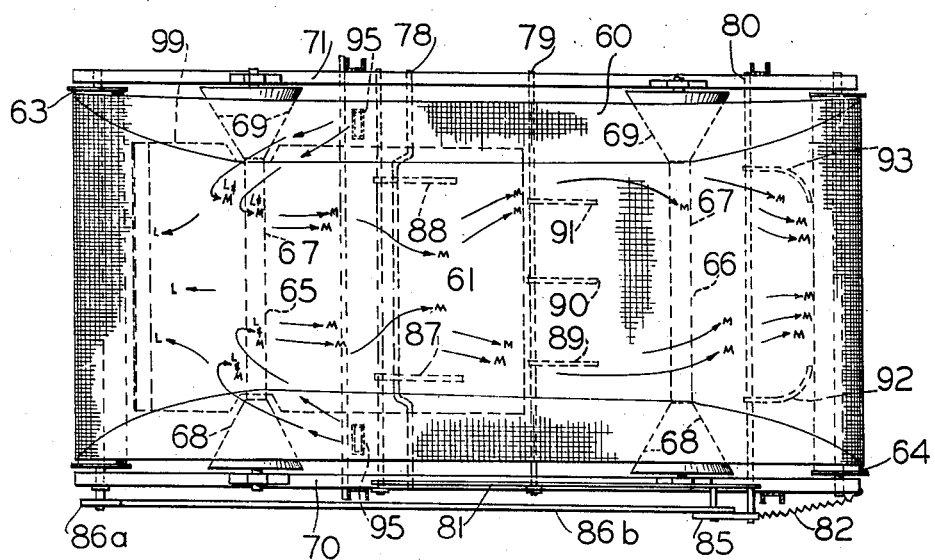
Figure 6 is a plan view of the embodiment of Figure 5, the hopper for feeding the infested nuts being omitted for greater clearness.

In Figures 5 and 6 is illustrated another embodiment of the invention, which differs from the form previously illustrated in having two intermediate drums instead of one and in having a plurality of sets of striking fingers for vibrating the conveyor belt.

Referring to Figures 5 and 6, the reference numeral 60 indicates the conveyor belt generally, and the numerals 61 and 62 denote the upper and lower stretches of said belt. The belt is trained, as shown, about the two end drums 63 and 64 and the two intermediate drums 65 and 66. Each of the intermediate drums has a central cylindrical portion 67 and two end portions 68 and 69 of conical shape.

The four drums are mounted in a suitable manner between the lateral frame-members 70 and 71. These frame-members are mounted for angular adjustment between the vertical frame-members 72 and 73. The frame-members 70 and 71 and the elements carried thereby may be moved to a desired angular position by means of the windlass 74 and the connecting cable or rope 75. The pawl 76 mounted on the vertical frame-member 74 cooperates with the drum of the windlass, which may have a corrugated surface, and serves to maintain the frame-members 70 and 71 in the desired angular setting.

The conveyor belt 60 may be moved in the direction of the upper drum 64 in the manner to be hereinafter described. It will be understood that as the upper stretch 62 of the belt in its travel approaches the intermediate drum 65, the marginal edges are gradually raised above the normal level, thereby forming a trough-shaped portion. As the belt leaves the vicinity of the intermediate drum 66, the marginal edges are gradually lowered. The material of the belt, as previously stated, is flexible enough to permit the belt to adjust itself to the trough-like shape during its upper course and to resume its flat shape on its lower course. Also as previously stated, the belt should preferably have a rough surface such as represented by woven wire or embossed rubber.

The present embodiment is provided with three rocking shafts, 78, 79 and 80, each of which is provided with a plurality of striking fingers to be hereinafter described. The three shafts may be rocked in unison by connecting them to a common rod 81, which extends parallel to one of the lateral frame-members 70. The last shaft 80 is connected to the frame-member 70 by means of a spring 82 and is provided with an arm 83, which has a curved end 84. This curved end rides over a ratchet provided on a disk 85, which is mounted for rotation in the frame-member 70.

The ratchet disk 85 may be driven in unison with the conveyor belt 60 from a pulley 86, which is mounted in the frame-work, and which is connected in any suitable manner to a source of power such as a motor (not shown). As shown in Figure 5, a pulley 86a is provided on the same shaft as the end drum 63, and the driving pulley 86 is connected to said pulley 86a and the ratchet disk 85 by means of a belt 86b. The reference numeral 86c designates an idler pulley which serves the usual purpose for such pulleys.

The first rocker shaft 78 may advantageously be spaced about one-third the distance from the intermediate drum 65 to the intermediate drum 66, the second rocker shaft 79 may be spaced about half-way between the rocker shaft 78 and the second intermediate drum 66, and the third rocker shaft 80 may be positioned just beyond the second intermediate drum 66.

The first rocker shaft 78 is preferably provided, as shown in Figure 6, with two striking fingers 87 and 88, each spaced about one-fourth of the distance from one of the marginal edges of the conveyor belt. The second rocker shaft 79 is preferably provided with three striking fingers 89, 90 and 91. The middle striking finger 90 is preferably positioned about the center line of the conveyor belt, and the fingers 89 and 91 are each spaced about one-third of the distance from one of the marginal edges of the conveyor belt. The second rocker shaft is preferably provided with two striking fingers, each one of which is spaced relatively close to one of the marginal edges of the belt, e. g. about one-sixth the width of the belt. The striking fingers on the two rocker shafts 78 and 79 are preferably substantially straight rods, while those on the shaft 80 are curved somewhat toward the center of the belt. It will be understood that the striking fingers may be adjusted as to the arc through which their free ends move in order to predetermine the blow given the belt.

The apparatus is preferably provided with a hopper 94 having two spouts, one of which is indicated on Figure 5 by the numeral 95. As in the case of the previously described embodiments, each spout is positioned just above one of the marginal edges of the belt 60, so that the infested nuts will fall on both raised marginal edges and tend to slide or roll into the trough formed in the upper course of the belt. The two spouts may advantageously be connected, as by means of the linkage 96 with the common connecting rod 81 of the rocker shafts, so that the infested nut meats will be fed in synchronism with the rocking of the shafts.

The manner in which the worms and larvae are separated from the nut meats is shown in Figure 6 by means of arrows. As in the previously described embodiments, the infested nut meats (L & M), as they fall onto the raised marginal edges of the conveyor belt 60, tend to run or slide into the hollow of the trough. The worms and larvae, denoted by L, tend to roll down along the bottom of the trough and over the lower end of the belt into a container, such as the tray 97 shown in Figure 5. The nut meats indicated by M, tend to be carried up the middle of the trough, being jostled nearer the center by means of the first set of striking fingers 87 and 88. The second set of striking fingers 89, 90 and 91 serve to jostle the nut meats to the sides of the trough, thereby splitting the upgoing stream into two. Most of the worms that may be occluded in the mass of nut meats are thereby released and roll down the center of the trough. The two fingers 92 and 93 of the last set of striking fingers jostle the two streams toward the center, so that all of the meats pass over the upper end of the conveyor belt 60 in a single stream. Any gobs that may be left after the second set of striking fingers are shaken apart by the last set of striking fingers, and the last few worms roll down the middle section of the trough. The second set of striking fingers serves to divert the worms coming from the upper end of the belt to the sides of the trough so that they avoid the upcoming stream of nut meats. The finally separated nut meats fall off the upper end of the conveyor belt into a suitable container designated in Figure 5 by 98.

A dust trough, such as indicated in Figures 5 and 6 by numeral 99, may be provided, though it is not generally necessary. The specific details of the dust trough do not constitute an essential part of the invention and hence will not be described.

The conveyor belt of the embodiment shown in Figures 5 and 6 may be made of a considerably greater length than the belt of Figures 1 and 2, and may be operated at a much greater speed. This embodiment is so effective that a single unit is all that is necessary to obtain a complete separation of the worms and larvae.

In conclusion, it is to be understood that, although the invention has been described with considerable detail and particularity and certain specific terms and language have been utilized, the foregoing disclosure is illustrative rather than restrictive, and that the details of construction may be modified without departing from the scope or spirit of the invention.

I claim:

1. A device for separating worms and larvae from nut meats, said device comprising an inclined, endless conveyor belt, two end drums over which said belt is trained, means to move said belt with its upper stretch travelling up the incline, and means to impart a trough-like shape to the upper stretch of said belt, said last mentioned means consisting of a drum positioned between said end drums and having a cylindrical mid-section and conical end-sections.

2. The device defined in claim 1, and means to feed nut meats to said belt at one or both sides of the trough-shaped portion, whereby the nut meats will slide down into the hollow of the trough-shaped portion.

3. A device for separating worms and larvae from nut meats, said device comprising an inclined, endless conveyor belt, two end drums and an intermediate drum over which said belt is trained, said intermediate drum having a cylindrical mid-section and conical end-sections, the upper stretch of said belt being formed into a trough-shaped portion by said intermediate drum, and means to move said belt with its upper stretch travelling up the incline.

4. A device for separating worms and larvae from nut meats, said device comprising an inclined, endless conveyor belt, two end drums and an intermediate drum over which said belt is trained, said intermediate drum having a cylindrical mid-section and conical end-sections, the upper stretch of said belt being formed into a trough-shaped portion by said intermediate drum, means to move said belt with its upper stretch travelling up the incline, and means to feed nut meats to said belt at one or both sides of the trough-shaped portion, whereby the nut meats will slide down into the hollow of the trough-shaped portion.

5. A device for separating worms and larvae from nut meats, said device comprising an inclined, endless conveyor belt, two end drums and an intermediate drum over which said belt is trained, said intermediate drum having a cylindrical mid-section and conical end-sections, the upper stretch of said belt being formed into a trough-shaped portion by said intermediate drum, means to move said belt with its upper stretch travelling up the incline, means to feed nut meats to said belt at one or both sides of the trough-shaped portion, whereby the nut meats will slide down into the hollow of the trough-shaped portion, and means to vibrate the upper stretch of said belt.

6. A device for separating worms and larvae from nut meats, said device comprising an inclined, endless conveyor belt, two end drums and two intermediate drums over which said belt is trained, said intermediate drums each having a cylindrical mid-section and conical end sections, the upper stretch of said belt being formed into a trough-shaped portion by said intermediate drums, and means to move said belt with its upper stretch travelling up the incline.

7. A device for separating worms and larvae from nut meats, said device comprising an inclined, endless conveyor belt, two end drums and two intermediate drums over which said belt is trained, said intermediate drums each having a cylindrical mid-section and conical end sections, the upper stretch of said belt being formed into a trough-shaped portion by said intermediate drums, means to move said belt with its upper stretch travelling up the incline, and means to feed nut meats to said belt at one or both sides of the trough-shaped portion, whereby the nut meats will slide down into the hollow of the trough-shaped portion.

8. A device for separating worms and larvae from nut meats, said device comprising an inclined, endless conveyor belt, two end drums and two intermediate drums over which said belt is trained, said intermediate drums each having a cylindrical mid-section and conical end sections, the upper stretch of said belt being formed into a trough-shaped portion by said intermediate drums, means to move said belt with its upper stretch travelling up the incline, means to feed nut meats to said belt at one or both sides of the trough-shaped portion, whereby the nut meats will slide down into the hollow of the trough-shaped portion, and means to vibrate the upper stretch of said belt.

ELLIS ALBAUGH, Sr.